US010606645B2

(12) United States Patent
Vernier

(10) Patent No.: US 10,606,645 B2
(45) Date of Patent: *Mar. 31, 2020

(54) GENERATING TIMING SEQUENCE FOR ACTIVATING RESOURCES LINKED THROUGH TIME DEPENDENCY RELATIONSHIPS

(71) Applicant: International Business Machines Corporation, Armonk, NY (US)

(72) Inventor: Dominique Vernier, Brussels (BE)

(73) Assignee: International Business Machines Corporation, Armonk, NY (US)

(*) Notice: Subject to any disclaimer, the term of this patent is extended or adjusted under 35 U.S.C. 154(b) by 438 days.

This patent is subject to a terminal disclaimer.

(21) Appl. No.: 15/257,306

(22) Filed: Sep. 6, 2016

(65) Prior Publication Data

US 2016/0378555 A1    Dec. 29, 2016

Related U.S. Application Data

(63) Continuation of application No. 14/271,785, filed on May 7, 2014, now Pat. No. 9,471,379, which is a (Continued)

(30) Foreign Application Priority Data

Oct. 9, 2009    (EP) ..................... 09172669

(51) Int. Cl.
G06F 9/50    (2006.01)
G06F 9/48    (2006.01)
G06F 9/46    (2006.01)

(52) U.S. Cl.
CPC .......... G06F 9/5011 (2013.01); G06F 9/4843 (2013.01); G06F 9/4887 (2013.01); G06F 9/5038 (2013.01)

(58) Field of Classification Search
None
See application file for complete search history.

(56) References Cited

U.S. PATENT DOCUMENTS 5,890,134 A    3/1999 Fox
6,088,626 A    7/2000 Lilly et al.
(Continued)

OTHER PUBLICATIONS

Yuan et al.; Time Optimization Heuristics for Scheduling Budget-Constrained Grid Workflows, vol. 26, No. 2 (Feb. 2009). English Abstract. [online]. 2 pages. [retrieved on Jun. 23, 2009]. Retrieved from the Internet:<URL: www.airiti.com/CEPS/ec_en/ecjnlarticleView. aspx?inlcattype=1&jnlptype=4&jnltype=41&jnliid=1556&issueiid=79271&atliid=1516152 >.
(Continued)

*Primary Examiner* — Eric C Wai
(74) *Attorney, Agent, or Firm* — Schmeiser, Olsen & Watts, LLP; Mark Vallone

(57) ABSTRACT

A method, and associated computer program product and computer system. A Direct Acyclic Graph (DAG) includes nodes and directed edges. Each node represents a unique resource and is a predefined Recovery Time Objective (RTO) node or an undefined RTO node. Each directed edge directly connects two nodes and represents a time delay between the two nodes. The nodes are topologically sorted to order the nodes in a dependency sequence of ordered nodes. A corrected RTO is computed for each ordered node.

16 Claims, 11 Drawing Sheets

Related U.S. Application Data continuation of application No. 12/876,368, filed on Sep. 7, 2010, now Pat. No. 8,793,690.

(56) References Cited

U.S. PATENT DOCUMENTS

| | | |
|---|---|---|
| 6,463,346 B1 | 10/2002 | Flockhart et al. |
| 7,082,605 B2 | 7/2006 | Alletson et al. |
| 7,114,154 B1 | 9/2006 | Crohn |
| 7,246,075 B1 | 7/2007 | Testa |
| 7,533,043 B2 | 5/2009 | Carney et al. |
| 8,078,691 B2 | 12/2011 | Zhang et al. |
| 8,793,690 B2 | 7/2014 | Vernier |
| 9,722,870 B2 | 8/2017 | Rattner et al. |
| 10,044,639 B2 | 8/2018 | Kimmet |
| 2005/0197877 A1 | 9/2005 | Kalinoski |
| 2006/0059032 A1 | 3/2006 | Wong et al. |
| 2008/0027687 A1 | 1/2008 | Aldridge |
| 2009/0133027 A1 | 5/2009 | Gunning et al. |
| 2009/0171707 A1 | 7/2009 | Bobak et al. |
| 2009/0171731 A1 | 7/2009 | Bobak et al. |
| 2009/0172769 A1 | 7/2009 | Bobak et al. |
| 2014/0245321 A1 | 8/2014 | Vernier |

OTHER PUBLICATIONS

Yuan et al.; Cost-effective Heuristics for Workflow Scheduling in Grid Computing Economy. IEEE. The Sixth International Conference on Grid and Cooperative Computing (GCC 2007). 8 pages. < URL: ieeexplore.ieee.org/xpl/freeabs_all.jsp?tp=&arnumber=4293797&isnumber=4293747 >.

Office Action (dated Apr. 26, 2013) for U.S. Appl. No. 12/876,368, filed Sep. 7, 2010, Conf. No. 1193.

Response (filed Aug. 22, 2013) for U.S. Appl. No. 12/876,368, filed Sep. 7, 2010, Conf. No. 1193.

Final Office Action (dated Dec. 19, 2013) for U.S. Appl. No. 12/876,368, filed Sep. 7, 2010, Conf. No. 1193.

Final Response (filed Feb. 19, 2014) for U.S. Appl. No. 12/876,368, filed Sep. 7, 2010, Conf. No. 1193.

Notice of Allowance (dated Mar. 17, 2014) for U.S. Appl. No. 12/876,368, filed Sep. 7, 2010, Conf. No. 1193.

Office Action (dated Dec. 18, 2015) for U.S. Appl. No. 14/271,785, filed May 7, 2014.

Zhang et al., Task Scheduling and Voltage Selection for Energy Minimization, DAC2002, Jun. 10-14, 2002, New Orleans LA, USA, pp. 183-188.

Amendment (dated Mar. 17, 2016) for U.S. Appl. No. 14/271,785, filed May 7, 2014.

Notice of Allowance (dated Jul. 1, 2016) for U.S. Appl. No. 14/271,785, filed May 7, 2014.

GENERATING TIMING SEQUENCE FOR ACTIVATING RESOURCES LINKED THROUGH TIME DEPENDENCY RELATIONSHIPS

This application is a continuation application claiming priority to Ser. No. 14/271,785, filed May 7, 2014, now U.S. Pat. No. 9,471,379, issued Oct. 18, 2016, which is a continuation to Ser. No. 12/876,368, filed Sep. 7, 2010, U.S. Pat. No. 8,793,690, issued Jul. 29, 2014.

FIELD OF THE INVENTION

The preset invention relates generally to the field of resource management and more particularly to a system method for generating an activation sequence of resources in consideration of their interdependencies and Recovery Time Objective.

BACKGROUND OF THE INVENTION

IT system often deals with resources and their availability. In case of disaster, all systems could be off and thus should be reactivated in a way to minimize the business impact. Service Level Agreement (SLA), which may for example define how long a system can be off without impacting the business. Once this period ends, the system should be back on. The acceptable elapse time that a resource can be off without impacting the business is generally defined as the Recovery Time Objective (RTO).

IT Systems are not anymore monolithic. With new technologies, such as Service Oriented Architecture, an end-user application uses different services provided by other systems and these services also can use other services and so on. So, dependencies exist between the end-user applications and services. These services use also other systems, such as web-servers, application-servers, databases and so on. This is another level of dependencies. These intermediate systems must be on to allow the full system to run correctly. This is not only true at the application level components but also at the infrastructure level. The systems such as the above mentioned (end-user applications, services, databases . . . ) need an infrastructure to run. The infrastructure is a composition of servers, network, routers, power supply, etc. Each of these components is in fact a resource which must be available at a certain moment to respect the business need and these resources are linked to each other because some resources need others to be fully operational.

It is also possible that a resource needs another resource but not immediately. For example, a resource needs another but only one hour after its own activation or next Wednesday or the first day of the next month. This means that a dependency delay also exits.

Then it becomes important to find the optimized activation sequence for all resources composing a solution in order to minimize the business impact.

The present invention offers a solution to this need.

SUMMARY OF THE INVENTION

The present invention provides a method, and an associated computer program product and computer system, for generating a timing sequence for activating resources linked through time dependency relationships, said method comprising:

providing a first Direct Acyclic Graph (DAG) having a simulation date and comprising multiple nodes and multiple directed edges, wherein each node of the multiple nodes represents a unique resource and is either a predefined Recovery Time Objective (RTO) node comprising a predefined RTO denoting a maximum elapsed time that the unique resource is permitted to remain in its current state or an undefined RTO node comprising a positive infinite value, wherein the multiple nodes comprise at least two predefined RTO nodes and at least zero undefined RTO nodes, wherein each directed edge of the multiple direct edges represents a time delay and directly connects two nodes of the multiple nodes in a direction from a predecessor node of the two nodes to a successor node of the two nodes, wherein a predecessor resource being the unique resource represented by the predecessor node has a time dependency on a successor resource being the unique resource represented by the successor node such that the predecessor resource requires the successor resource to be in the successor resource's target state no later than a time consisting of the simulation date incremented by the time delay;

topologically sorting the nodes of the multiple nodes to order the multiple nodes in a dependency sequence of ordered nodes, such that each node in the dependency sequence whose unique resource has a time dependency on the unique resource of at least one other node in the dependency sequence is placed in the dependency sequence before each node of the at least one other node;

in traversal of the ordered nodes in the dependency sequence, computing a corrected RTO for each ordered node if the dependency sequence as a function of (i) the predefined RTO of said each ordered node and, for each predecessor node connected to said each ordered node: (ii) the corrected RTO of said each predecessor node and (iii) the time delay represented by the edge that directly connects said each predecessor node to said each ordered node;

after said computing the corrected RTO for each ordered node, calculating an estimated RTO as a corrected RTO for each ordered node remaining as an undefined RTO node, said estimated RTO calculated as a function of: (a) the corrected RTO of each successor node of each remaining undefined RTO node and (b) the time delay represented by the edge that directly connects each remaining undefined RTO node to said each successor node; and reordering the ordered nodes in the dependency sequence according to an ascending order of the corrected RTO of the ordered nodes to form an activation sequence of the multiple nodes defining a time ordering of activation of the unique resources represented by the multiple nodes.

DETAILED DESCRIPTION OF THE INVENTION

Figure 1:
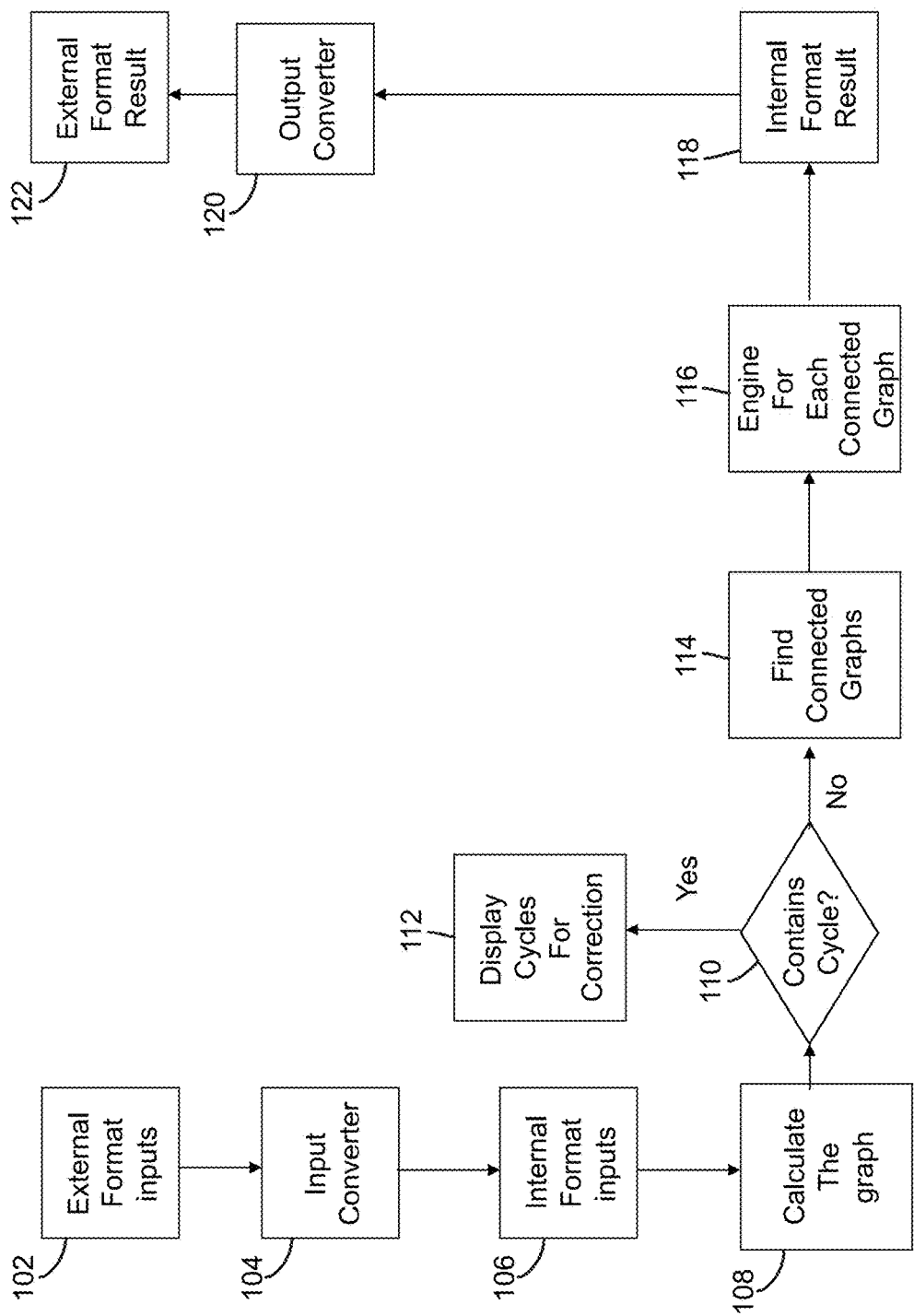
FIG. 1 is a flow chart of a method used in the present invention.

Embodiments of the invention are described herein after by way of examples with reference to the accompanying figures and drawings. The following is a short outline of the concepts, components and wording used in the present description.

Resource is any physical or virtual entity which is in a current state and could be move to a target state. To move a resource from its current state to the target state, the resource could need other resources. Activating a resource means taking an action to move the resource from the current state to the target state. A state doesn't mean that a resource can provide a given functionality to its predecessor because this can be achieved by dividing a single resource into several resources, each providing its own functionality. A state means that a resource needs a set of resources to be able to run in the given state. The state of a resource determines the dependency on which the resource is depending on.

A dependency is a way to describe that a resource needs another resource before having the target state. Dependency has different attributes such as a dependency time delay. The dependency time delay may be a literal value or an expression. The expression can be transformed to a literal value using a date as reference. The dependency can be active or not depending on the target state of its source. A non-active dependency can be ignored by the method in one embodiment.

A successor of an original resource is a resource needed by the original resource to move to the target state of the successor resource.

A predecessor of an original resource is a resource which needs the original resource to move to the target state of the original resource.

A source of a dependency: as the dependencies are directed, the source dependency is the resource from which the dependency relationship starts.

A target of a dependency: as the dependencies are directed, the target dependency is the resource to which the dependency relationship ends.

An incoming dependency for a resource is a dependency which has the resource as target.

An outgoing dependency for a resource is a dependency which has the resource as source.

A CRON expression means 'Computer Run On' expression as defined in the computer world. A CRON is commonly a string comprising several fields that represent a set of times.

Delay on a dependency is the time delay that a resource of a predecessor can wait for the successor of the predecessor to change into the successor's target state. The time can be represented by a literal value or a CRON expression. CRON expression is used here to represent a time expression, but a skilled person in the art could find another way of representing such expression. If a dependency has a time delay equal to zero, then the dependency is a synchronous dependency (i.e., the resource needs the dependent resource right-away). Otherwise if the time delay is a positive value, then the dependency is an asynchronous dependency (i.e., the resource can wait for the dependent resource). A dependency time delay can also be negative; for example, resource 'A' depends on 'B', and 'B' needs 2 hours to be able to provide the service requested by 'A'. This dependency can be expressed by stating that 'A' depends on 'B' with a time delay of hours. In other words, the application 'B' should start 2 hours before the RTO of 'A'. The dependency time delay is often defined by the functional requirements and the design of the solution.

State Expression of a dependency is an expression which determines if a dependency is active or not.

RTO means Recovery Time Objective. It is the acceptable elapsed time that a resource can stay at the current state without impacting the business. The time can be defined as a literal value or as a CRON expression.

A corrected RTO is an RTO that satisfies all RTOs and time delays of its predecessors recursively.

An estimated RTO is an RTO calculated for a resource where no 'Corrected RTO' was obtained. Different methods can be applied to calculate an estimated RTO. The estimated RTO is usually calculated based on the successors and outgoing dependencies of a resource. This attribute is represented in the present invention by a Boolean flag. If the flag is set to true then the corrected RTO attribute contains an estimated RTO; otherwise the corrected RTO contains a corrected RTO based on the RTO given by the business.

A simulation date is used to convert a CRON expressed RTO or a time delay in a literal value. For example if an expression for an RTO is that "the resource must be ON by next Monday 11:00 AM" and the simulation date is "Monday 8:00 AM", the RTO al value is 3 hours. Thus, a simulation date expresses a specified time on a specified date and therefore is in units of time, so that a simulation date can be incremented by a time delay. Simulation dates may vary and differ simulation dates may be provided by using either a vector of simulation dates or a CRON expression and thus will provide different results.

A graph that is used herein is a directed weighted graph in the sense of the graph theory. It is a collection of vertexes representing resources and directed edges representing time dependencies. Each edge has a vertex as source and a vertex as target. A vertex is also called a "node". The edges are weighted with the time delay. By convention, the edges are defined as playing the role of 'dependency' (e.g., resource R1 depends on resource R2) but the opposite role, namely 'serve,' could also be defined (e.g., resource R2 serves resource R1) without departing from the spirit and scope of the present invention. The resources and dependencies are represented by a directed graph where vertices are resources and edges are dependencies. Each resource has a Recovery Time Objective property and each dependency has a time delay property. If the delay property is zero, the dependency is synchronous; otherwise the dependency is asynchronous.

A directed graph is called weakly connected if replacing all of its directed edges with undirected edges produces a connected undirected graph. An undirected graph is called connected if every pair of distinct vertices in the graph can be connected through some path. If a graph contains multiple weakly connected graphs, the process of the present invention is applied to each weakly connected graph separately.

FIG. 1 is a general flow chart of a method used in the present invention. In the first step 102, an external format of the graph is defined. The format may be defined as a table, an XML format, a database or any data-model and/or technology that can support a directed graph model. In step 104, the external format is called, read and transformed into an internal computer format (step 106). The internal format may satisfy a predefined data model as the one shown in FIG. 3. Afterwards, step 108 will determine which dependencies are active or not. Depending on their source target state and their dependency state expression, the non-active dependencies are removed from the graph. In the next step 110, the process checks if the graph contains a cycle. If yes, the process then stops in step 112 as no optimized activation sequence can be found because there exists a cycle in the graph. A cycle will prevent the possibility to find an activation sequence. If resources are fine grained enough and follow the principle of 'separation of concerns' no cycle should be discovered. As known by those skilled in the art, in computer science, Separation of Concerns (SoC) is the process of separating a computer program into distinct features that overlap in functionality as little as possible.

Going back to step 110, if no cycle exists in the graph then the process continues with step 14. In step 114, the different weakly connected graphs are searched. Next step 116 is repeated for each simulation date and each weakly connected graph found in a previous step. Step 116 is further detailed with reference to FIG. 2. The results generated are stored in an internal format (step 118). In step 120, the results are converted into a user friendly format and provided to the end user in step 122 in the form of a table, a graphic, and/or reports.

Figure 2:
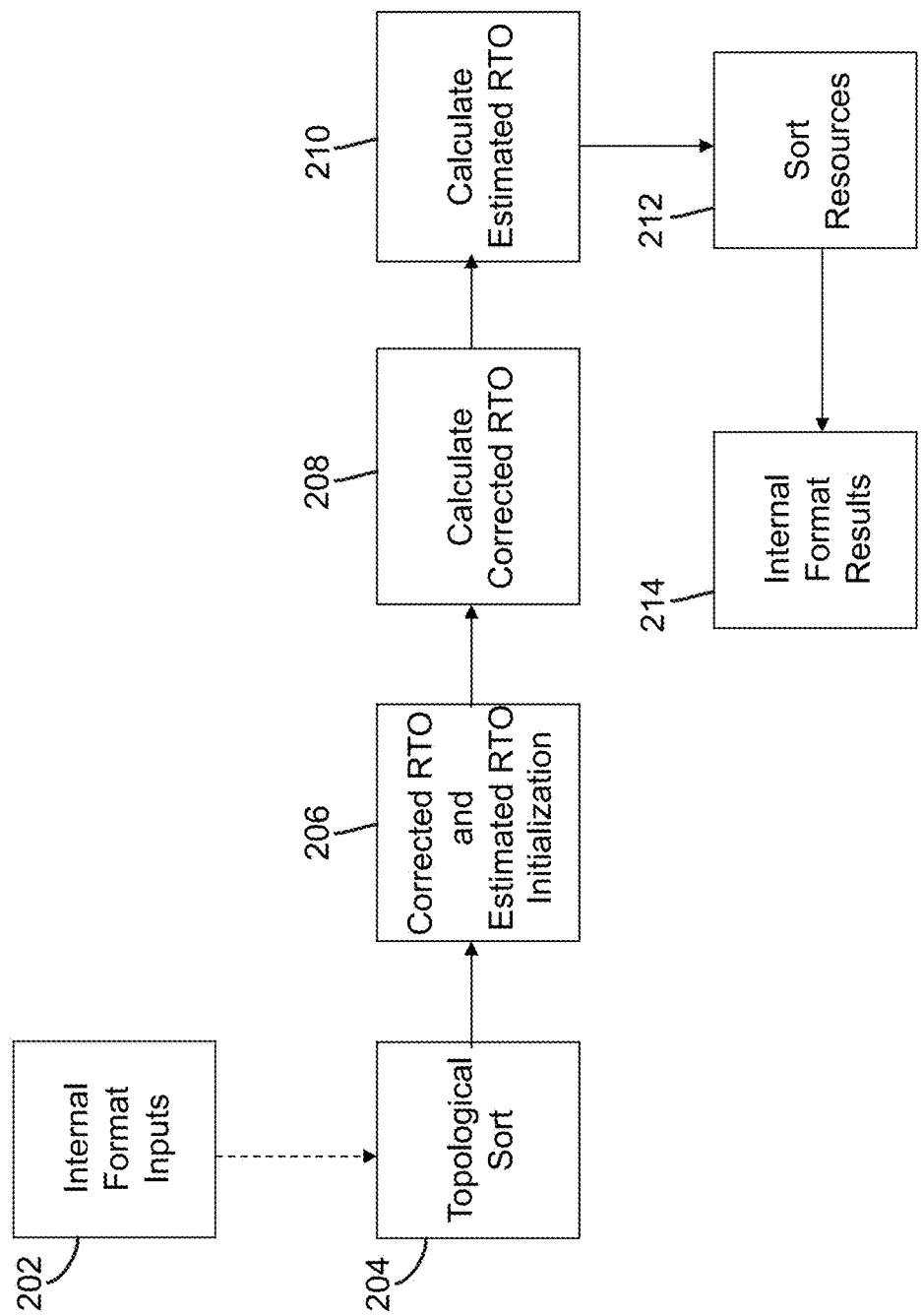
FIG. 2 shows the steps to determine an optimized activation sequence of resources as a function of their interdependencies and recovery time objective, in accordance with embodiments of the present invention.

FIG. 2 details the different steps performed by step 116 of FIG. 1 to determine an optimized activation sequence of resources as a function of their interdependencies and recovery time objective, in accordance with embodiments of the present invention. The method depicted in FIG. 2 generates a timing sequence for activating resources linked through time dependency relationships. The method depicted in FIG. 2 provides a first Direct Acyclic Graph (DAG) having a simulation date and comprising multiple nodes and multiple directed edges. The graph representation of the DAG is received in an internal computer format (step 202). As per FIG. 1, the process is run for each weakly connected graph for each simulation date. Each node of the multiple nodes in the DAG represents a unique resource and is either a predefined Recovery Time Objective (RTO) node comprising a predefined RTO denoting a maximum elapsed time that the unique resource is permitted to remain in its current state or an undefined RTO node comprising a positive infinite value. In one embodiment, the multiple nodes comprise at least two predefined RTO nodes and at least zero (i.e., zero or more) undefined RTO nodes, wherein each directed edge of the multiple direct edges represents a time delay and directly connects two nodes of the multiple nodes in a direction from a predecessor node of the two nodes to a successor node of the two nodes. A predecessor resource is the unique resource represented by the predecessor node and has a time dependency on a successor resource. The successor resource is the unique resource represented by the successor node such that the predecessor resource requires the successor resource to be in the successor resource's target state no later than a time consisting of the simulation date incremented by the time delay.

In step 204, a topological sort is done on the graph. Different algorithms may be used to realize this sort operation such as the known 'Kahn' or 'depth-first search' algorithms . . . to name a few of those that a skilled person could apply. The topological sort is executed only on directed acyclic graphs identified by steps 110 and 114 of FIG. 1. The topological sort issues a sequence of resources ordered in a way that if a first resource (R1) has a direct or an indirect dependency with another resource (R2) then R1 will be placed before R2 in the sequence.

In next step 206, an initialization of the corrected RTO value is made. The corrected RTO is initialized with a positive infinite value and the estimated RTO flag is set to false. The positive infinite value will be represented as the maximum number that the attribute that represents the RTO can get. Often the computer language offers a literal called MAX_VALUE for a given numerical type. If the current state timestamp is not defined, it will be set to the earliest date that the system can support. This means the resource has always been in this current state.

Figure 5:
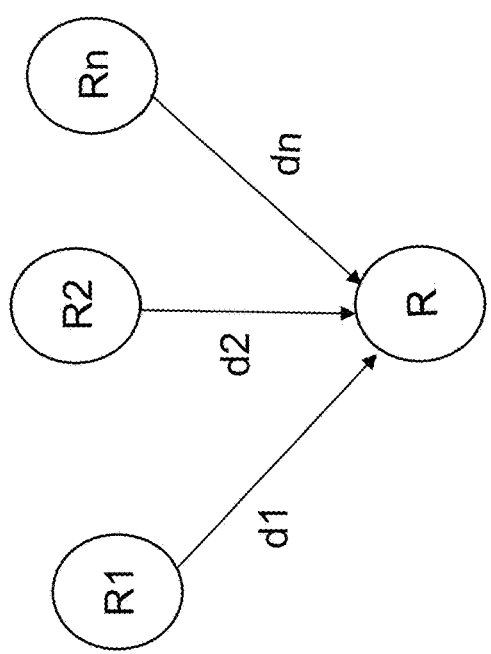
FIG. 5 depicts a resource with its predecessors, in accordance with embodiments of the present invention.

In step 208 the 'Corrected RTO' is computed. This is done by traversing the resources as sorted during the topologic sort step, and the corrected RTO is calculated for each resource R as illustrated in FIG. 5.

Firstly, the current 'Corrected RTO' for all resources $R_i$ and R is determined, where i denotes a given resource $R_i$ being the source of a dependency (Ri, R). In other words, $R_i$ is one of the predecessors of R. The current 'Corrected RTO' is determined as follows.

If the current 'Corrected RTO' is defined (i.e., not equal to a positive infinite value), then the 'Corrected RTO' is set as the current 'Corrected RTO'.

If the 'Corrected RTO' is not defined (i.e., equal to a positive infinite value) and if the current state of the resource is not equal to the target state, then: (i) if the RTO is a literal, then the current 'Corrected RTO' takes this literal as value; or (ii) if the RTO is a CRON expression, then the current 'Corrected RTO' takes the literal value calculated based on the CRON expression and the simulation date.

If the 'Corrected RTO' is not defined (i.e., equal to a positive infinite value) and if the current state of the resource is equal to the target state, then the 'Corrected RTO' will be set with the difference between the current state timestamp and the simulation date.

Secondly, the new 'Corrected RTO' is set with a minimum value $X_i$ calculated as a function of all resources $R_i$ having a dependence on R ($R_i$, R) (meaning for all incoming dependencies) and R's current 'Corrected RTO', wherein $X_i$ is the sum of the current 'Corrected RTO' of the resource $R_i$ and the time delay $d_i$ of the edge between $R_i$ and R. If R current 'Corrected RTO' is not the minimum and R has its current state equal to the target state, then an error should be raised because R should be activated earlier to satisfy the new constraint. If a resource has no predecessor, such as for the first resource the topological sort, then as there is no ($R_i$, R) dependency and there is no $X_i$, and thus the minimum value is the current 'Corrected RTO' of R. If the time delay is a CRON expression, the conversion to a literal value is done by calculating the next date using, as base date, the sum of the source resource current 'Corrected RTO' and the simulation date. Once the next date is found, the base date is subtracted from the next date to find the literal time delay.

Once all Corrected RTOs are computed, if there remains one or more resource(s) still having an undefined 'Corrected RTO', step 210 may be performed to compute an Estimated RTO for each such resource.

It is to be noted that while an undefined RTO is not recommended, the present invention comprises a step to take into consideration such a case having an undefined RTO. An undefined RTO may appear either if the resources are not specified originally by a business entity or if no other resource imposes an RTO on the resources. This may also happen when a resource has all its predecessors with an undefined 'Corrected RTO'.

Thus in step 208 in traversal of the ordered nodes in the dependency sequence, a corrected RTO is computed for each ordered node in the dependency sequence as a function of (i) the predefined RTO of said each ordered node and, for each predecessor node connected to said each ordered node: (ii) the corrected RTO of said each predecessor node and (iii) the time delay represented by the edge that directly connects said each predecessor node to said each ordered node.

As an option not shown in FIG. 2, the process may skip step 210 in case there is no undefined RTO.

Figure 6:
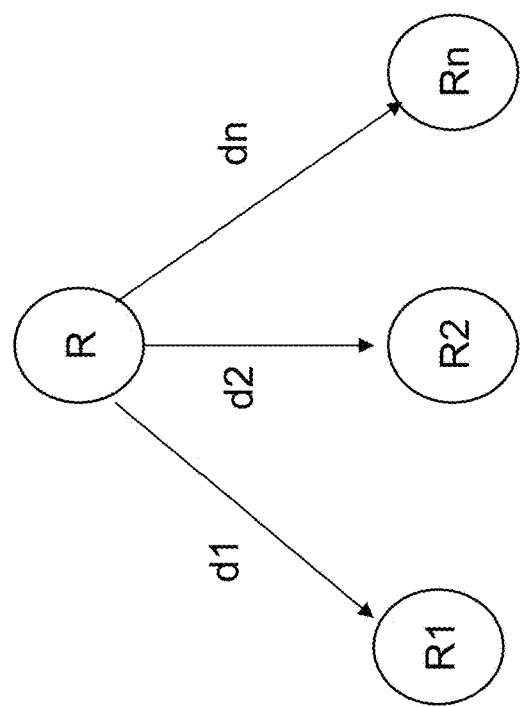
FIG. 6 depicts a resource with its successors, in accordance with embodiments of the present invention.

The 'Estimated RTO' is calculated in step 210 by traversing the resources as sorted during the topological sort step in the reverse order, and is calculated for each resource R (as illustrated in FIG. 6). If a resource R has a positive infinite value as 'Corrected RTO', it is set to a negative infinite value, the 'Estimated RTO' flag is set to true and the estimated RTO becomes the maximum value $X_i$ calculated in function of all resources where i denotes a given a resource being the target of a dependency (R, $R_i$) (meaning for all outgoing dependencies) and R's 'Corrected RTO', wherein $X_i$ is the difference of the $R_i$ 'Corrected RTO' and the time delay $d_i$ of the edge between R and $R_i$. Otherwise, the resource with a finite 'Corrected RTO' is skipped and no 'Estimate RTO' is calculated. The negative infinite value will be represented as the minimum number that the attribute that represents the RTO can get. Often the computer language offers a literal called MIN_VALUE for a given numerical type.

As step 208 has already been run when step 210 is performed, all resources RTO CRON expressions are already converted. If the time delay is a CRON expression, the literal value is equal to the difference between the 'Corrected RTO' of the dependency target resource and the next date generated by the CRON expression using the simulation date as base date. This gives the deadline to activate the resource; otherwise synchronization will be missed between resources.

Thus in step 210, which is performed after the corrected RTO is computed in step 208 for each ordered node, an estimated RTO is calculated as a corrected RTO for each ordered node remaining as an undefined RTO node. The estimated RTO is calculated as a function of: (a) the corrected RTO of each successor node of each remaining undefined RTO node; and (b) the time delay represented by the edge that directly connects each remaining undefined RTO node to said each successor node.

While a method to calculate an Estimated RTO has been described in one embodiment, alternative methods to estimate undefined RTO could also be applied. For example another way to calculate Xi is to set the values to Ri without taking into account the time delays di. This is equivalent to set the (R, Ri) dependency time delay to zero and thus to transform the asynchronous dependency to a synchronous one.

The skilled person will appreciate that if some resources still have undefined 'Corrected RTO', the process is partially complete. In that case, these resources are placed at the beginning of the final sequence. Similarly, if negative 'Corrected RTO' is found for resource having the current state not equal to the target state, the skilled person will interpret that the constraints provided by the business are too strict or the IT solution design is not optimized because the time delays between resources are too high. This case should then be forwarded to the business and IT department.

After step 208 and optionally step 210 are performed, the method goes to step 212 wherein resources are sorted based on their 'Corrected RTO'. In step 212, the ordered nodes are reordered in the dependency sequence according to an ascending order of the corrected RTO of the ordered nodes to form an activation sequence of the multiple nodes defining a time ordering of activation of the unique resources represented by the multiple nodes The optimized activation sequence is defined by an ascending sort of the resources regarding their 'Corrected RTO'. The comparator for operating the sort operation may be a conventional numerical comparator, except if two resources have the same 'Corrected RTO', then the topological sort found in step 204 is used in the reverse order to determine the final order between these two resources. This means that if a resource 'B' is placed after another resource 'A' in the topological sort while they have the same 'Corrected RTO', then resource 'B' will come in first because it should be started before resource 'A' in order to respect the dependency between them. Resources that have a current state equal to the target state can be removed from the sequence because no action should be taken to bring them to their target state.

Finally in step 214, the results of this process are provided.

Figure 3:
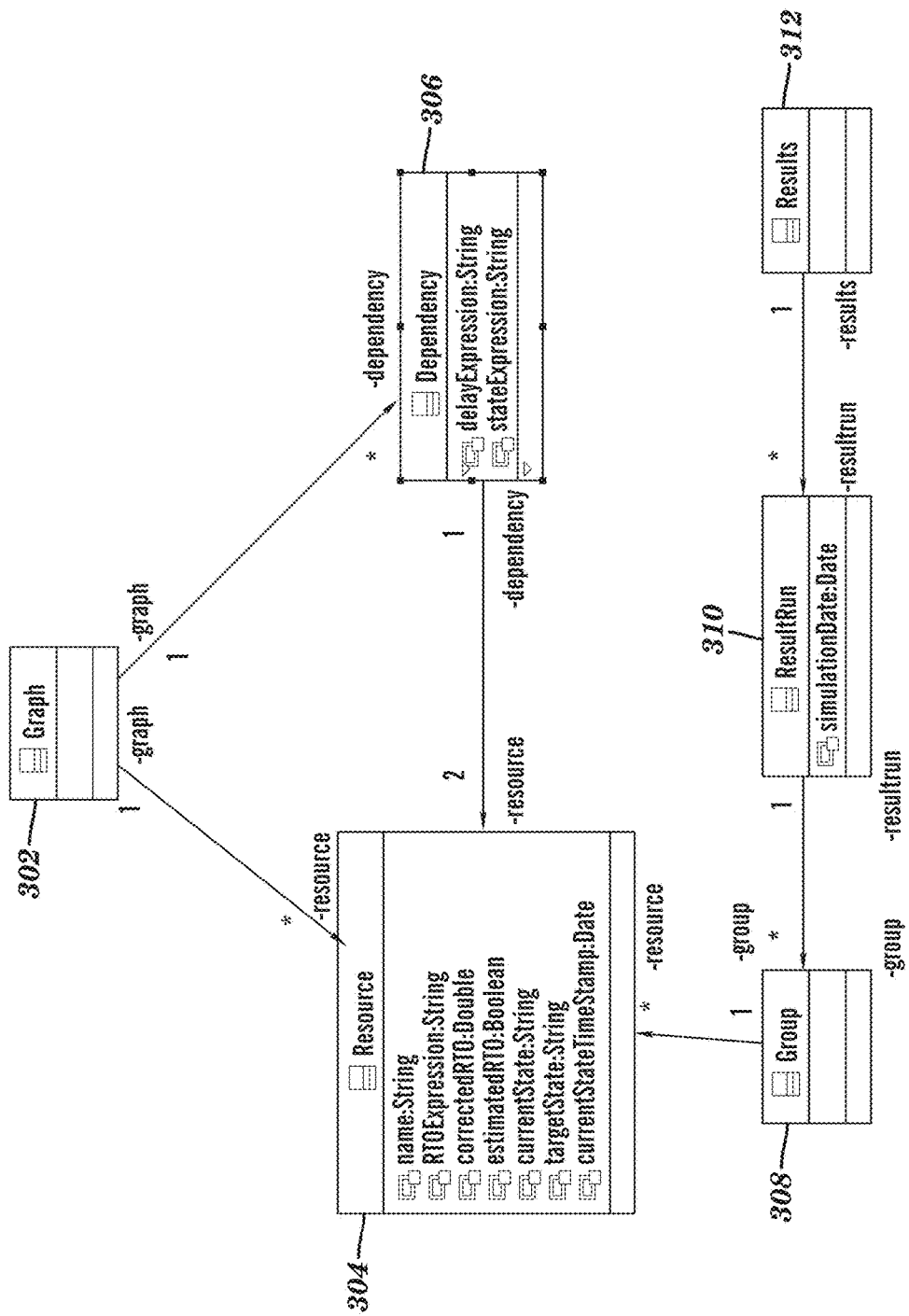
FIG. 3 depicts a data model used in the present invention.

FIG. 3 depicts a data-model in the Unified Modeling Language (UML) to store the graph representation and the results obtained by running the process of the present invention. The data-model comprises entities such as graph 302, resources 304 and dependencies 306. From the relation's direction and cardinality, a skilled person would deduce, for example, that a graph 302 contains a set of resources 304 and dependencies 306. A resource 304 is defined by several parameters as follows:

a name;
an RTO Expression, which can be a literal or a CRON expression;
a Corrected RTO, which will contain the calculated RTO regarding the RTO defined by the business and the time delay on dependencies;
an estimation RTO Boolean flag, which when set o false means that the corrected RTO value is a real corrected RTO deducted from the input data (otherwise it is an estimated RTO);
a current state, wherein this attribute will define the state of the resource at the time when this method will be applied and it is possible that the resource is already at the requested state;
a target state, which is the requested state that should be reached after the activation sequence found by this method is applied; and
a current state time stamp, wherein this represents the date and time when the resource reaches its current state. This attribute is used to calculate the 'corrected RTO' when the current state and the target state are identical.

A dependency 306 is defined by several items:
a source resource;
a target resource;
a time delay expression, which can be a literal or a CRON expression; and
a state expression, which will define if a dependency is active or not depending on the state of its source.

The data-model for the result is shown in the form of:
- a Group entity 308: a group contains the resources in the order as calculated by method of the present invention for a given weakly connected graph;
- a ResultRun entity 310: as the method is run for multiple simulation dates, one ResultRun entity represents the run for a given simulation date; and
- a Results entity 312: this is a single object which contains all runs for different simulation dates.

While the previous data-model represents one embodiment, it is to be appreciated that various other implementations could be used for providing a computer implemented representation of the graph data-model. Moreover, additional attributes/entities could also be added to implement different algorithms such as cycle detection, weakly connected graph discovering; or other useful attributes related to the business where the current invention is applied, for example the owner name of a given resource.

Figure 4:
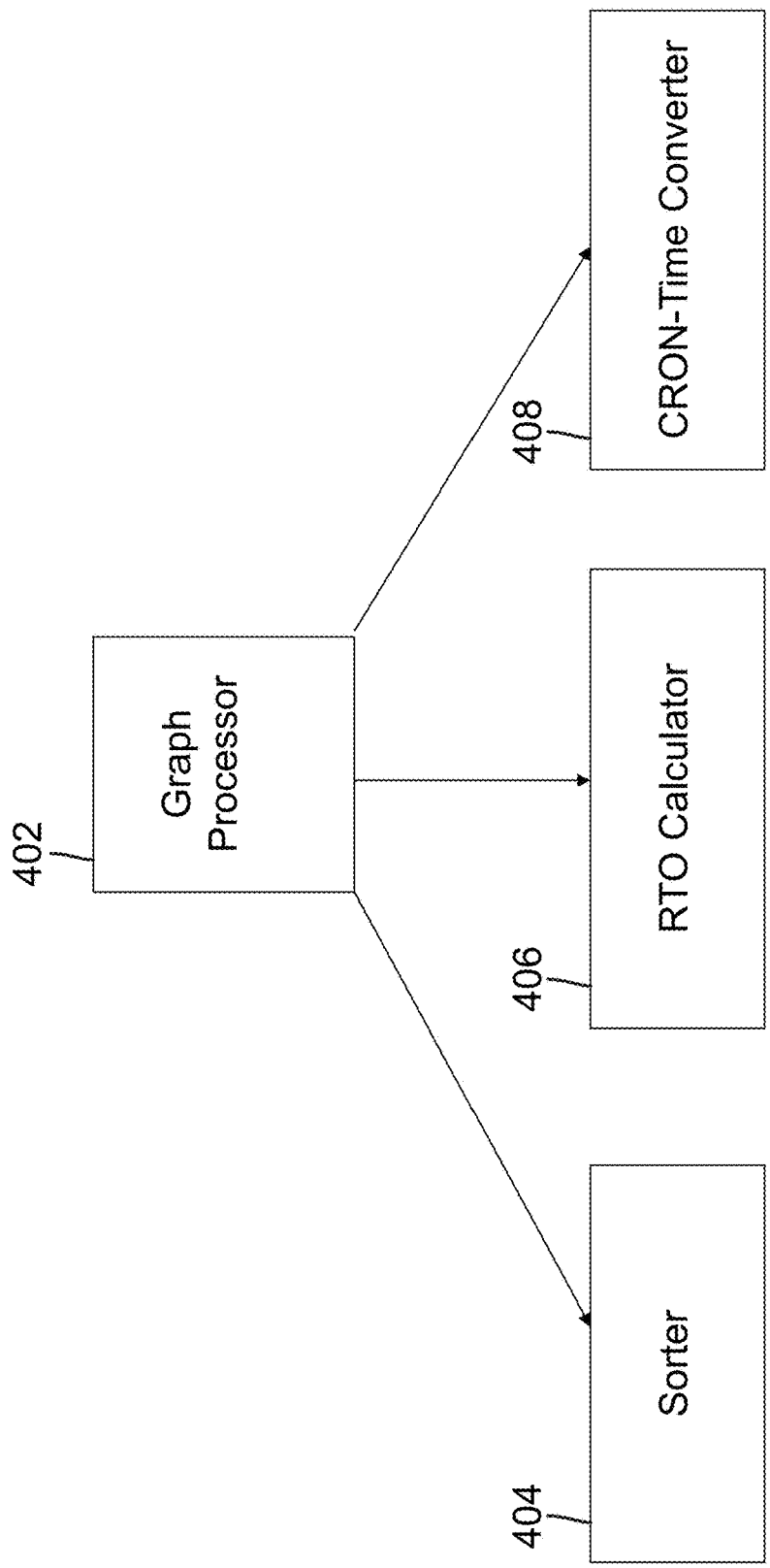
FIG. 4 depicts different components used in the present invention.

Going now to FIG. 4, the main components used in one embodiment of the present invention are described.

A 'Graph Processor' component (402) is the unit from which the calls of the different components to operate the process of the present invention are operated. A 'Sorter' component (404) is coupled to Graph Processor 402 and allows the realization of the topological sort (step 204 of FIG. 2) and the 'Corrected RTO' sort (step 208 of FIG. 2) operations.

A 'RTO Calculator' component (406) is also coupled to Graph Processor 402 and allows the calculation of the 'Corrected RTO' (step 208 of FIG. 2) and the 'Estimated RTO' (step 210 of FIG. 2).

A 'CRON-Time Converter' component 408 is coupled to the Graph Processor component 402 and allows converting the CRON expression for RTO and time delay into literal values depending on the simulation date, the current 'Corrected RTO' of the resource or the source of the dependency for a time delay conversion. This component is called at steps 208 and 210 of FIG. 2.

FIGS. 7 to 11 exemplify the method of the present invention at different steps of the process.

Figure 7:
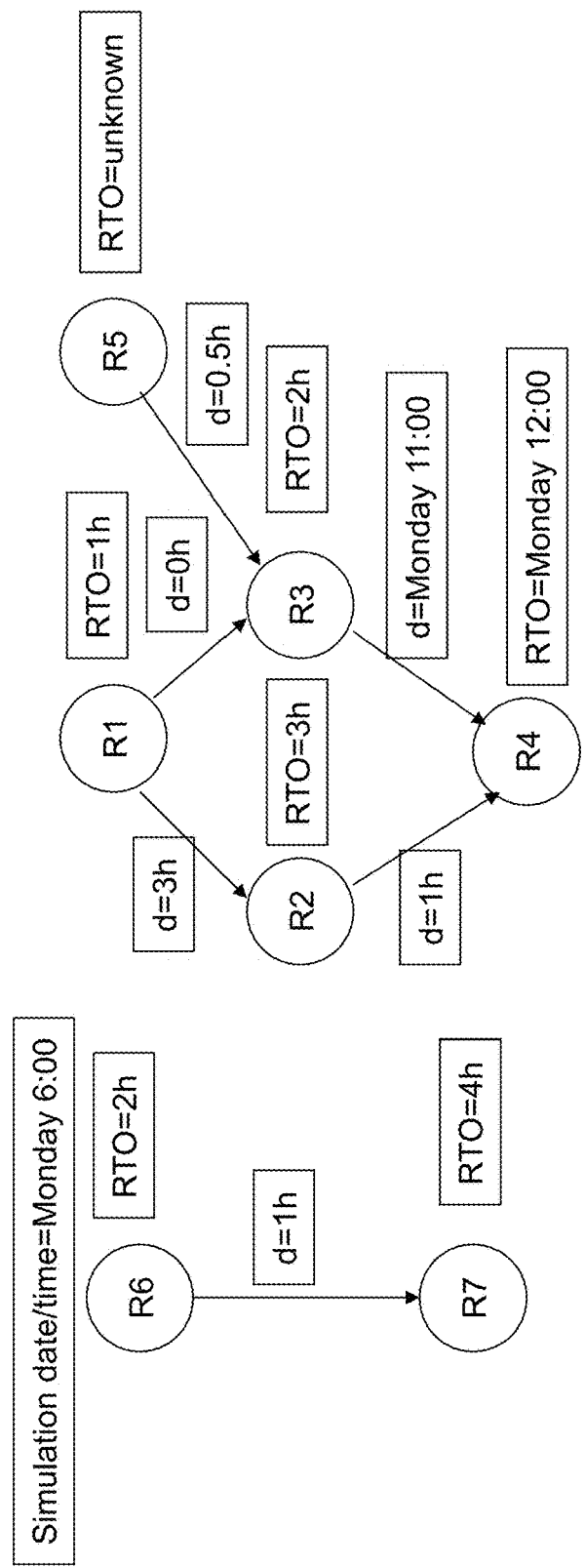
FIG. 7 depicts an example of input data pertaining to nodes of a directed graph, in accordance with embodiments of the present invention.

The example defined in FIG. 7 shows several resources R1 to R7 linked by different dependencies. Each dependency is characterized by a time delay. This example is based on a disaster recovery plan scenario where all resources have only two states 'ON' and 'OFF', the current state for all resources is 'OFF' and the target state 'ON'. The state expression on all dependencies indicates that all dependencies are active. Each resource has a RTO initially defined by business constraint except R5 for which the RTO is unknown and represented by a positive infinite value. In this example, R1 has a RTO equal to "1 hour" while R4 has a RTO defined as "Monday, 12:00" and so, for each resource contributing to the general system to be analyzed.

Each dependency has a time delay, and there are synchronous and asynchronous dependencies. Asynchronous dependencies can be literal or based on an expression. For example, the time delay of dependency between R1 and R3 is zero (synchronous); the time delay of dependency between R2 and R4 is equal to "1 hour", as well as the time delay between R6 and R7 (asynchronous literal based), while the time delay between R3 and R4 is defined as "Monday 11:00" (asynchronous expression based).

As already explained, RTOs and time delays may be expressed as literal values or CRON expressions. Moreover, in this example only one simulation date is defined: Simulation date/time="Monday 6:00"; but the process may be repeated for any number of additional simulation dates.

As previously explained, a pre-requisite step is to remove all cycles from the graph and split the graph in weakly connected graphs as shown by steps 110, 112 and 114 of FIG. 1.

In the example of FIG. 7, two weakly connected graphs are respectively made of resources R1 to R5 for the first graph consisting of 5 nodes and of resources R6 and R7 for the second graph consisting of 2 nodes. Generally, the DAG of the present invention consists of at least 2 nodes (e.g., 2 nodes, 3 nodes, 4 nodes, 5 nodes, etc., or at least two nodes, at least 3 nodes, at least 4 nodes, at least 5 nodes, etc.).

The multiple nodes in the first graph of resources to R5 in FIG. 7 comprise:
- at least one node not connected to any successor node,
- at least one node connected to at least two successor nodes,
- at least one node to which no predecessor node is connected, and
- at least one node to which at least two predecessor nodes are connected.

Figure 8:
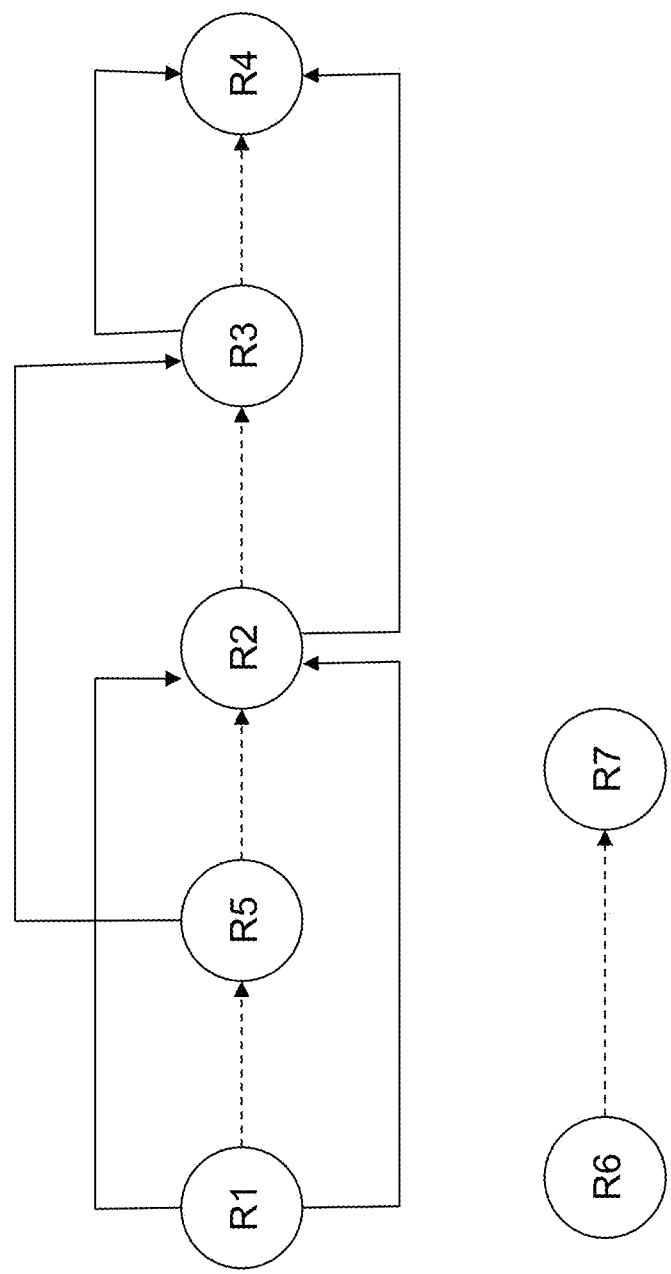
FIG. 8 depicts the result of the topological sort of the nodes in FIG. 7, in accordance with embodiments of the present invention.

The following description is focused on the first graph composed by resources R1 to R5. As per step 204 of FIG. 2, a topological sort on the graph is performed. Depending on the algorithm used and the data-model representation applied, the result of the topological sort may slightly vary. FIG. 8 exemplifies one representation of a topological sort on resource R1 to R5. By reading this topological sort in the reverse order, the activation sequence of the resources gives that R4 is to be activated first, then R3, then R2, then R5 and finally R1. Such sequence not being optimized for the business objective and the time delay due to dependency between resources, an optimization is to be found by running the method of the present invention.

If the graph for resources R1 to R5 in FIG. 7 is denoted as a first DAG, then the graph of topologically sorted nodes in FIG. 8 may be denoted as a second DAG depicting the dependency sequence of ordered nodes and comprising directed paths identifying each two nodes connected by a directed edge in the first DAG of FIG. 7.

Figure 9:
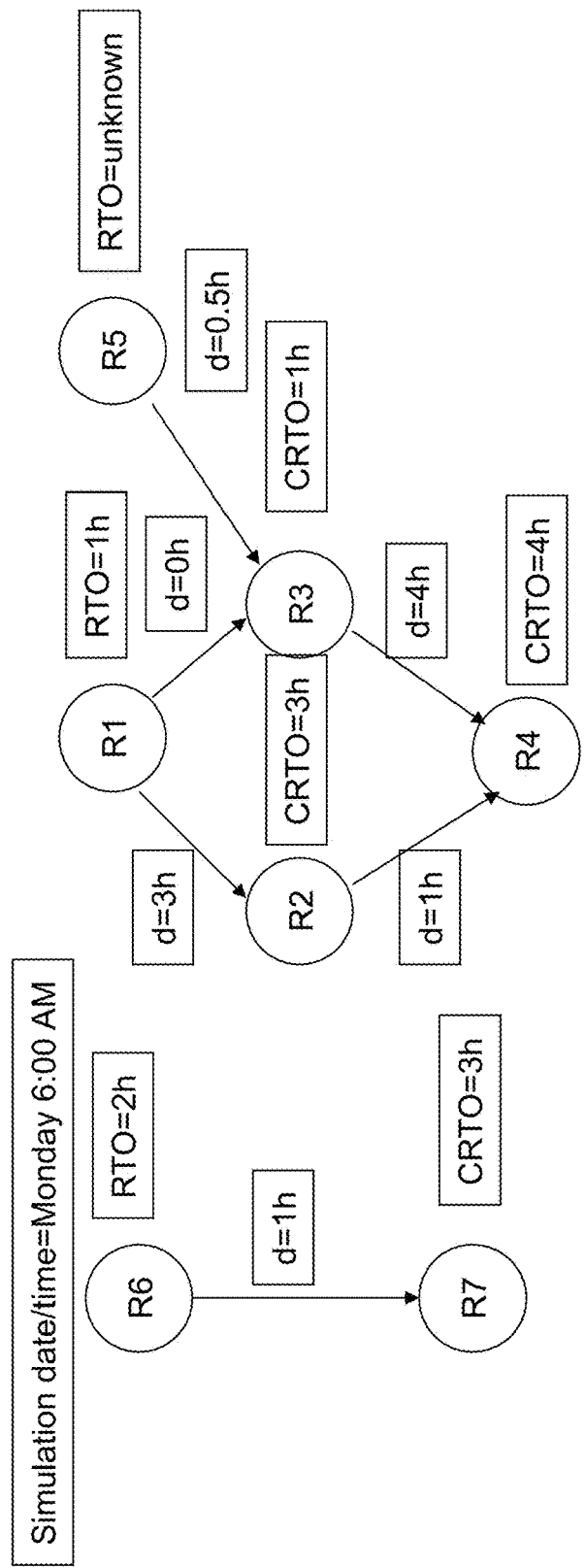
FIG. 9 depicts the result after the calculation of corrected RTO of the nodes in FIG. 7, in accordance with embodiments of the present invention.

FIG. 9 shows the result after the 'Corrected RTO' calculation is done as per step 208 of FIG. 2. To achieve this result, each resource R1 to R5 in FIG. 7 is analyzed one after the other in the order defined by the topological sort of FIG. 8 according to the following algorithm for computing the corrected RTO for each ordered node in the dependency sequence depicted in FIG. 8.

For each ordered node to which no predecessor node is connected, the corrected RTO of each said ordered node is set equal to the predefined RTO of said each ordered node.

For each ordered node to which at least one predecessor node is connected:
- for each predecessor node of at least one predecessor node, the method computes a sum of the corrected RTO of each predecessor node and the time delay represented by the edge that directly connects each predecessor node to each ordered node, which computes at least one sum such that each sum of the at least one sum corresponds to a respective predecessor node of the at least one predecessor node; and
- the corrected RTO of each ordered node is set equal to the minimum of the predefined RTO of said each ordered node and a minimum sum of the at least one sum.

The preceding algorithm is applied to the example in FIG. 7 as follows.

A 'Corrected RTO' attribute is initialized with a positive infinite value and an 'Estimated RTO' flag is set to false as specified in step 206.

Analyzing R1 shows that R1 doesn't have any predecessor. So, the 'Corrected RTO' of R1 is set to its current RTO.

Next, R5 is analyzed and similarly the 'Corrected RTO' of R5 is set to its current RTO.

The 'Corrected RTO' of R2 is set to the RTO value of "3 hours" because the sum of the 'Corrected RID' of R1 (1 hour) and the time delay between R1 and R2 (3 hours) is equal to "4 hours" which is greater than the current 'Corrected RTO' of R2 (3 hours)

The 'Corrected RTO' of R3 is set to "1 hour" because for the dependency (R1, R3), the sum of the 'Corrected RTO' of R1 and the time delay is equal to "1 hour". For the other dependency (R5, R3), the sum of the 'Corrected RTO' of R5 and the time delay is a positive infinite value. So, the 'Corrected RTO' of R3 is set to "1 hour" because it is the minimum value between the current 'Corrected RTO' of R3 (2 hours), the (R1, R3) calculation (1 hour), and the positive infinite value provided by the calculation of (R5, R3).

The 'Corrected RID' of R4 is initially set to "6 hours" because the CRON expression is "Monday 12:00 AM" and the simulation date is "Monday 6:00 AM". The time delay CRON expression of (R3, R4) is set to "4 hours" because the simulation date is "Monday 6:00 AM", but as from the above calculation, the process knows that R3 should be ready 1 hour after the simulation date, meaning on "Monday 7:00 AM", and as the time delay is set as "Monday 11:00 AM", the literal time delay becomes "4 hours". The sum of the 'Corrected RTO' of R3 and the time delay (R3, R4) is thus "1 hour+4 hours=5 hours". The sum of the 'Corrected RTO' of R2 and the time delay (R2, R4) is thus "3 hours+1 hour=4 hours". The minimum value between these three computed values (R4 initial=6 hours, (R3, R4)=5 hours and (R2, R4)=4 hours) is "4 hours" and thus the 'Corrected RTO' of R4 is finally set to "4 hours".

FIG. 9 shows that R5 still doesn't have a defined RTO. So, step 210 of the method of the present invention is run to calculate an 'Estimated RTO' for R5. The graph is traversed following the reverse order defined by the topological sort for calculating the estimated RTO of said each remaining undefined RTO node comprises according to the following algorithm.

For each successor node of at least one successor node of said each remaining undefined RTO node, a difference is calculated between the corrected RTO of each successor node and the time delay represent d by the edge that directly connects each remaining undefined RTO node to said each successor node, which calculates at least one difference such that each difference of the at least one difference corresponds to a respective successor node of the at least one successor node. Then, the estimated RTO of each remaining undefined RTO node is equal to a maximum difference of the at least one difference.

Figure 10:
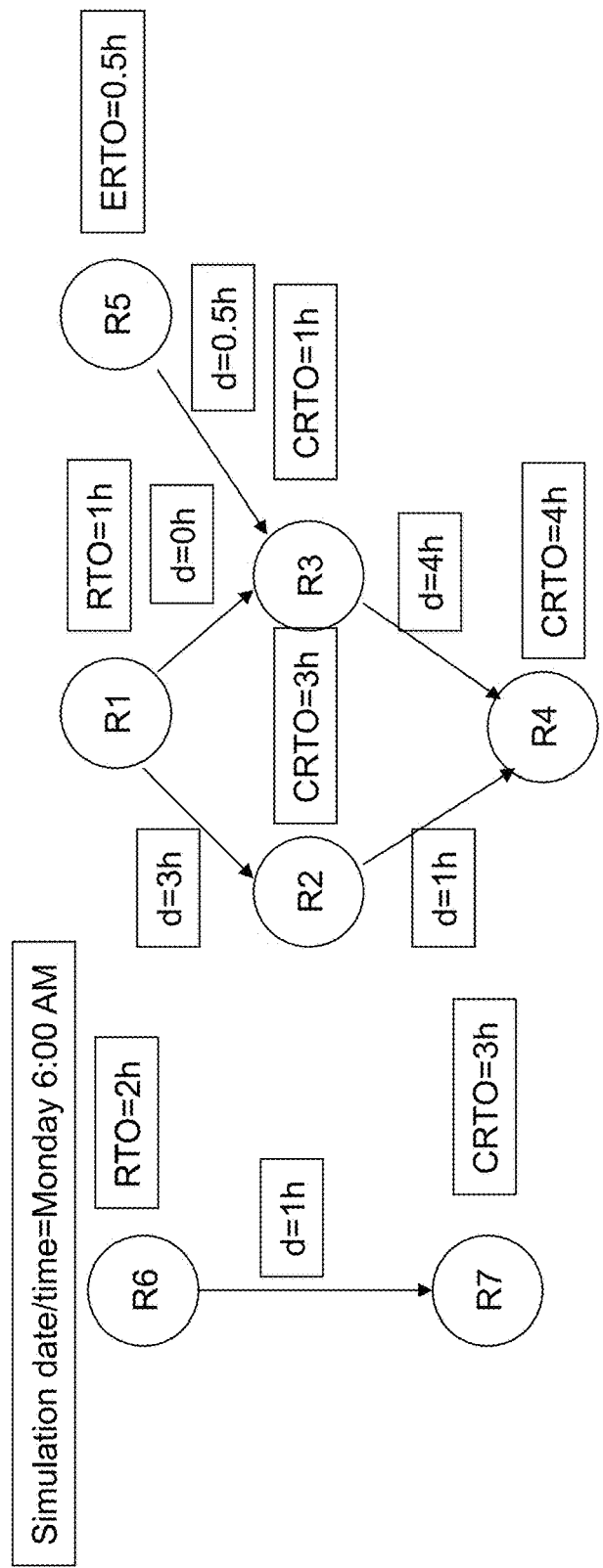
FIG. 10 depicts the result after the calculation of the estimated RTO of the nodes in FIG. 9, in accordance with embodiments of the present invention.

The results of applying the preceding algorithm to implement step 210 of FIG. 2 are depicted in FIG. 10. Resources R4, R3 and R2 are skipped because their 'Corrected RTO' is already known.

The 'Corrected RTO' of R5 is set to "0.5 hour" because R5 has only one successor R3, and the 'Corrected RTO' of R3 is "1 hour", the time delay is "0.5 hour" and the difference between these is equal to "0.5 hour". In the case when such a resource has multiple successors, then the maximum difference would be taken as becoming the Estimated RTO.

Resource R1 is skipped too because its 'Corrected RID' is defined and known (even if equal to its current RTO).

Figure 11:
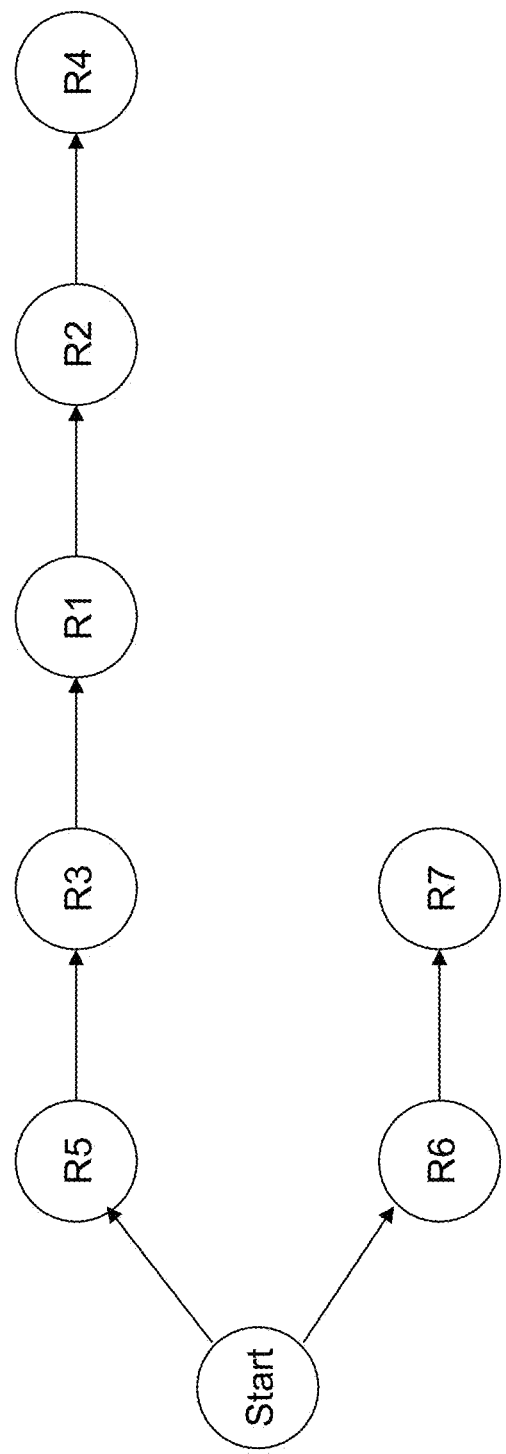
FIG. 11 depicts a reordering of the nodes of FIG. 8 through use of the corrected RTO of the nodes in 10, in accordance with embodiments of the present invention.

The final step 212 of FIG. 2 is then applied to the graph of FIG. 10. Step 212 sorts the resources by reordering the resources based on their 'Corrected RID' in an ascending order. The results are depicted in FIG. 11 and show the sequence of activation of resources R1 to R5 according to the previous calculated RTOs (R1=1, R2=3, R3=1, R4=4 and R5=0.5). So, in the first position, R5 with a 'Corrected RTO' equal to 0.5 hour is to be activated first. Next, even R1 and R3 have the same 'Corrected RTO', the topological sort provides that R3 is after R1 (as shown in FIG. 8); and so in the second position, R3 is to be activated, followed by R1 in the third position. Afterwards, in the fourth position, R2 is to be activated, and then finally R4 is to be activated. Thus as shown, the final optimized activation sequence for R1 to R5 is: R5, R3, R1, R2 and R4. The preceding activation sequence is graphically represented in FIG. 11 as a DAG depicting the multiple nodes in the activation sequence.

Figure 12:
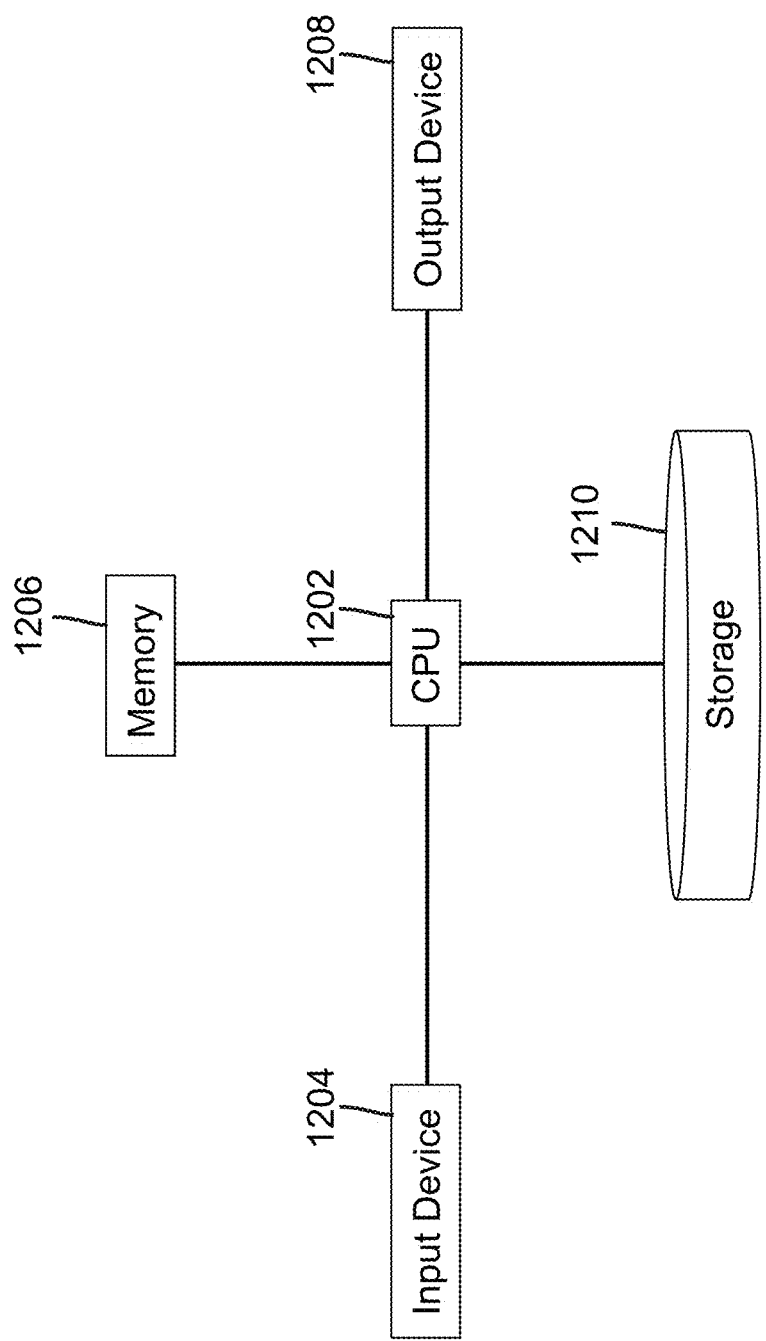
FIG. 12 depicts a computer system for implementing embodiments of the present invention.

The present invention can be implemented on a computer system as depicted in FIG. 12. The data are entered in the storage via the 'input device' (1204). The present invention will load the computer code for implementing method from the storage (1212) and then read the data from the storage (1212). The data and method are stored in the memory (1206). The CPU (1202) will run the method and process the data to realize the present invention. The results will be sent to the output device (1208) or to the storage (1212). The present invention thus provides a computer implemented method or system and can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product comprising a physically tangible computer-readable storage medium storing the program code for use by, or in connection with a computer of the computer system using a computer processor (i.e., CPU 1202). For the purposes of this description, a computer-readable storage medium can be any physically tangible apparatus or device that can store the program for use by, or in connection with the computer system, apparatus, or device.

The computer-readable storage medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It has to be appreciated that while the invention has been particularly shown and described with reference to a preferred embodiment to determine an activation sequence of a plurality of resources; various changes in form and detail may be made therein without departing from the spirit, and scope of the invention. Specifically, the present invention is well suited and easily applicable by a person skilled in the art to determine a deactivation sequence of the same plurality or any other plurality of resources.

Also, the time delay for a resource to change from one state another can be taken into account by subtracting this time delay from the RTO before processing the graph.

Particularly, while embodiments of the present invention have been described in the Information Technology area where resources are IT resources such as applications, services, and network components, the present method may be applied in different industries where an optimized activation sequence of resources is mandatory.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, said method comprising:
   providing, by a processor of a computer system, a first Direct Acyclic Graph (DAG) comprising multiple nodes and multiple directed edges, wherein each node of the multiple nodes represents a unique resource and is either a predefined Recovery Time Objective (RTO) node comprising a predefined RTO denoting a maximum elapsed time that the unique resource is permitted to remain in its current state or an undefined RTO node comprising a positive infinite value, wherein the multiple nodes comprise at least two predefined RTO nodes and at least zero undefined RTO nodes;
   said processor topologically sorting the nodes of the multiple nodes in the first DAG to order the multiple nodes in a dependency sequence of ordered nodes, such that each node in the dependency sequence whose unique resource has a time dependency on the unique resource of at least one other node in the dependency sequence is placed in the dependency sequence before each node of the at least one other node;
   in traversal of the ordered nodes in the dependency sequence, said processor computing a corrected RTO for each ordered node in the dependency sequence as a function of (i) the predefined RTO of said each ordered node and, for each predecessor node connected to said each ordered node: (ii) the corrected RTO of said each predecessor node and (iii) the time delay represented by the edge that directly connects said each predecessor node to said each ordered node; and
   said processor reordering the ordered nodes in the dependency sequence according to an ascending order of the corrected RTO of the ordered nodes to form an activation sequence of the multiple nodes defining a time ordering of activation of the unique resources represented by the multiple nodes and to yield a second DAG in which the reordered nodes in the activation sequence are geometrically sequenced in a one-dimensional linear path in the ascending order of the corrected RTO.

2. The method of claim 1, said method further comprising:
   after said computing the corrected RTO for each ordered node, said processor calculating an estimated RTO as a corrected RTO for each ordered node remaining as an undefined RTO node, said estimated RTO calculated as a function of: (a) the corrected RTO of each successor node of each remaining undefined RTO node and (b) the time delay represented by the edge that directly connects each remaining undefined RTO node to said each successor node.

3. The method of claim 2, wherein a directed edge from a first node to a second node in each pair of successive nodes in the second DAG denotes that the second node is to be activated before the first node is activated.

4. The method of claim 2, wherein each directed edge of the multiple directed edges represents a time delay and directly connects two nodes of the multiple nodes in a direction from a predecessor node of the two nodes to a successor node of the two nodes, and wherein a predecessor resource being the unique resource represented by the predecessor node has a time dependency on a successor resource being the unique resource represented by the successor node.

5. The method of claim 4, wherein said computing the corrected RTO for each ordered node in the dependency sequence comprises:
   for each ordered node to which no predecessor node is connected, setting the corrected RTO of each said ordered node as equal to the predefined RTO of said each ordered node; for each ordered node to which at least one predecessor node is connected:
      for each predecessor node of the at least one predecessor node, computing a sum of the corrected RTO of each said predecessor node and the time delay represented by the edge that directly connects said each predecessor node to said each ordered node, which computes at least one sum such that each sum of the at least one sum corresponds to a respective predecessor node of the at least one predecessor node; and
      setting the corrected RTO of said each ordered node as equal to the minimum of: the predefined RTO of said each ordered node and a minimum sum of the at least one sum.

6. The method of claim 4, wherein the at least zero undefined RTO nodes comprise at least one undefined RTO node, and wherein said calculating the estimated RTO of said each remaining undefined RTO node comprises:
   for each successor node of at least one successor node of said each remaining undefined RTO node, calculating a difference between the corrected RTO of each said successor node and the time delay represented by the edge that directly connects said each remaining undefined RTO node to said each successor node, which calculates at least one difference such that each difference of the at least one difference corresponds to a respective successor node of the at least one successor node; and
   setting the estimated RTO of said each remaining undefined RTO node as equal to a maximum difference of the at least one difference.

7. The method of claim 1, wherein the method further comprises:
   said processor representing the topologically sorted nodes as another DAG depicting the dependency sequence of ordered nodes and comprising directed paths, wherein each directed path in the another DAG identifies two nodes in the first DAG connected by a respective directed edge in the first DAG.

8. The method of claim 1, wherein the at least zero undefined RTO nodes comprise at least one undefined RTO node.

9. A computer program product, comprising a computer readable hardware storage device having a computer readable program code stored therein, said program code configured to be executed by a processor of a computer system to implement a method for generating a timing sequence for activating resources linked through time dependency relationships, said method comprising:

provided, by said processor, a first Direct Acyclic Graph (DAG) comprising multiple nodes and multiple directed edges, wherein each node of the multiple nodes represents a unique resource and is either a predefined Recovery Time Objective (RTO) node comprising a predefined RTO denoting a maximum elapsed time that the unique resource is permitted to remain in its current state or an undefined RTO node comprising a positive infinite value, wherein the multiple nodes comprise at least two predefined RTO nodes and at least zero undefined RTO nodes;

said processor topologically sorting the nodes of the multiple nodes in the first DAG to order the multiple nodes in a dependency sequence of ordered nodes, such that each node in the dependency sequence whose unique resource has a time dependency on the unique resource of at least one other node in the dependency sequence is placed in the dependency sequence before each node of the at least one other node;

in traversal of the ordered nodes in the dependency sequence, said processor computing a corrected RTO for each ordered node in the dependency sequence as a function of (i) the predefined RTO of said each ordered node and, for each predecessor node connected to said each ordered node: (ii) the corrected RTO of said each predecessor node and (iii) the time delay represented by the edge that directly connects said each predecessor node to said each ordered node; and said processor reordering the ordered nodes in the dependency sequence according to an ascending order of the corrected RTO of the ordered nodes to form an activation sequence of the multiple nodes defining a time ordering of activation of the unique resources represented by the multiple nodes and to yield a second DAG in which the reordered nodes in the activation sequence are geometrically sequenced in a one-dimensional linear path in the ascending order of the corrected RTO.

10. The computer program product of claim 9, said method further comprising:

after said computing the corrected RTO for each ordered node, said processor calculating an estimated RTO as a corrected RTO for each ordered node remaining as an undefined RTO node, said estimated RTO calculated as a function of: (a) the corrected RTO of each successor node of each remaining undefined RTO node and (b) the time delay represented by the edge that directly connects each remaining undefined RTO node to said each successor node.

11. The computer program product of claim 10, wherein a directed edge from a first node to a second node in each pair of successive nodes in the second DAG denotes that the second node is to be activated before the first node is activated.

12. The computer program product of claim 10, wherein each directed edge of the multiple directed edges represents a time delay and directly connects two nodes of the multiple nodes in a direction from a predecessor node of the two nodes to a successor node of the two nodes, and wherein a predecessor resource being the unique resource represented by the predecessor node has a time dependency on a successor resource being the unique resource represented by the successor node.

13. A computer system comprising a processor and a computer readable memory unit coupled to the processor, said memory unit containing program code configured to be executed by the processor to implement a method for generating a timing sequence for activating resources linked through time dependency relationships, said method comprising:

provided, by said processor, a first Direct Acyclic Graph (DAG) comprising multiple nodes and multiple directed edges, wherein each node of the multiple nodes represents a unique resource and is either a predefined Recovery Time Objective (RTO) node comprising a predefined RTO denoting a maximum elapsed time that the unique resource is permitted to remain in its current state or an undefined RTO node comprising a positive infinite value, wherein the multiple nodes comprise at least two predefined RTO nodes and at least zero undefined RTO nodes;

said processor topologically sorting the nodes of the multiple nodes in the first DAG to order the multiple nodes in a dependency sequence of ordered nodes, such that each node in the dependency sequence whose unique resource has a time dependency on the unique resource of at least one other node in the dependency sequence is placed in the dependency sequence before each node of the at least one other node;

in traversal of the ordered nodes in the dependency sequence, said processor computing a corrected RTO for each ordered node in the dependency sequence as a function of (i) the predefined RTO of said each ordered node and, for each predecessor node connected to said each ordered node: (ii) the corrected RTO of said each predecessor node and (iii) the time delay represented by the edge that directly connects said each predecessor node to said each ordered node; and said processor reordering the ordered nodes in the dependency sequence according to an ascending order of the corrected RTO of the ordered nodes to form an activation sequence of the multiple nodes defining a time ordering of activation of the unique resources represented by the multiple nodes and to yield a second DAG in which the reordered nodes in the activation sequence are geometrically sequenced in a one-dimensional linear path in the ascending order of the corrected RTO.

14. The computer system of claim 13, said method further comprising:

after said computing the corrected RTO for each ordered node, said processor calculating an estimated RTO as a corrected RTO for each ordered node remaining as an undefined RTO node, said estimated RTO calculated as a function of: (a) the corrected RTO of each successor node of each remaining undefined RTO node and (b) the time delay represented by the edge that directly connects each remaining undefined RTO node to said each successor node.

15. The computer system of claim 14, wherein a directed edge from a first node to a second node in each pair of successive nodes in the second DAG denotes that the second node is to be activated before the first node is activated.

16. The computer system of claim 14, wherein each directed edge of the multiple directed edges represents a time delay and directly connects two nodes of the multiple nodes in a direction from a predecessor node of the two nodes to a successor node of the two nodes, and wherein a predecessor resource being the unique resource represented by the predecessor node has a time dependency on a successor resource being the unique resource represented by the successor node.

\* \* \* \* \*